United States Patent
Kanayama et al.

(10) Patent No.: US 12,117,945 B2
(45) Date of Patent: Oct. 15, 2024

(54) MEMORY CONTROLLER WITH PSEUDO-CHANNEL SUPPORT

(71) Applicant: Advanced Micro Devices, Inc., Santa Clara, CA (US)

(72) Inventors: Hideki Kanayama, San Jose, CA (US); YuBin Yao, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 21 days.

(21) Appl. No.: 17/849,117

(22) Filed: Jun. 24, 2022

(65) Prior Publication Data

US 2023/0418772 A1  Dec. 28, 2023

(51) Int. Cl.
*G06F 13/16* (2006.01)

(52) U.S. Cl.
CPC ...... *G06F 13/1689* (2013.01); *G06F 13/1621* (2013.01); *G06F 13/1642* (2013.01)

(58) Field of Classification Search
None
See application file for complete search history.

(56) References Cited

U.S. PATENT DOCUMENTS

| | | |
|---|---|---|
| 11,360,897 B1 | 6/2022 | Suh et al. |
| 2006/0294264 A1 | 12/2006 | Akiyama et al. |
| 2010/0309744 A1* | 12/2010 | Park .............. G11C 7/222 365/233.11 |
| 2012/0191943 A1* | 7/2012 | Ware ............. G11C 7/22 711/E12.001 |
| 2017/0031631 A1* | 2/2017 | Lee .............. G06F 3/0679 |
| 2018/0018105 A1* | 1/2018 | Magro .......... G11C 7/1072 |
| 2018/0018291 A1 | 1/2018 | Magro et al. |
| 2018/0019006 A1 | 1/2018 | Brandl et al. |
| 2020/0194090 A1 | 6/2020 | Royer et al. |
| 2020/0411062 A1 | 12/2020 | Narui |
| 2021/0263665 A1* | 8/2021 | Rao ............. G06F 13/1668 |

OTHER PUBLICATIONS

International Search Report and Written Opinion for International Application No. PCT/US2023/024969, mailed Oct. 11, 2023, 7 pages.

* cited by examiner

*Primary Examiner* — Charles J Choi
(74) *Attorney, Agent, or Firm* — Polansky & Associates, P.L.L.C.; Paul J. Polansky

(57) ABSTRACT

A data processor accesses a memory having a first pseudo channel and a second pseudo channel. The data processor includes at least one memory accessing agent for generating a memory access request, a memory controller for providing a memory command to the memory in response to a normalized request selectively using a first pseudo channel pipeline circuit and a second pseudo channel pipeline circuit, and a data fabric for converting the memory access request into the normalized request selectively for the first pseudo channel and the second pseudo channel.

20 Claims, 4 Drawing Sheets

MEMORY CONTROLLER WITH PSEUDO-CHANNEL SUPPORT

BACKGROUND

Modern dynamic random-access memory (DRAM) provides high memory bandwidth by increasing the speed of data transmission on the bus connecting the DRAM and one or more data processors, such as graphics processing units (GPUs), central processing units (CPUs), and the like. DRAM is typically inexpensive and high density, thereby enabling large amounts of DRAM to be integrated per device. Most DRAM chips sold today are compatible with various double data rate (DDR) DRAM standards promulgated by the Joint Electron Devices Engineering Council (JEDEC). Typically, several DDR DRAM chips are combined onto a single printed circuit hoard substrate to form a memory module that can provide not only relatively high speed but also scalability.

Recently, a new form of memory known as high-bandwidth memory (HBM) has emerged. HBM promises to increase memory speed and bandwidth by integrating a vertically-stacked memory die that allow a larger number of data signal lines and shorter signal traces to allow higher speed operation. An important feature of newer HBM memories is known as pseudo channel mode. Pseudo channel mode divides a channel into two individual subchannels that operate semi-independently. The pseudo-channels share the command bus, but execute commands individually. While pseudo-channel mode will allow further flexibility, it creates challenges for the memory controller to schedule accesses efficiently within each pseudo-channel at the high command rate.

Figure 1:
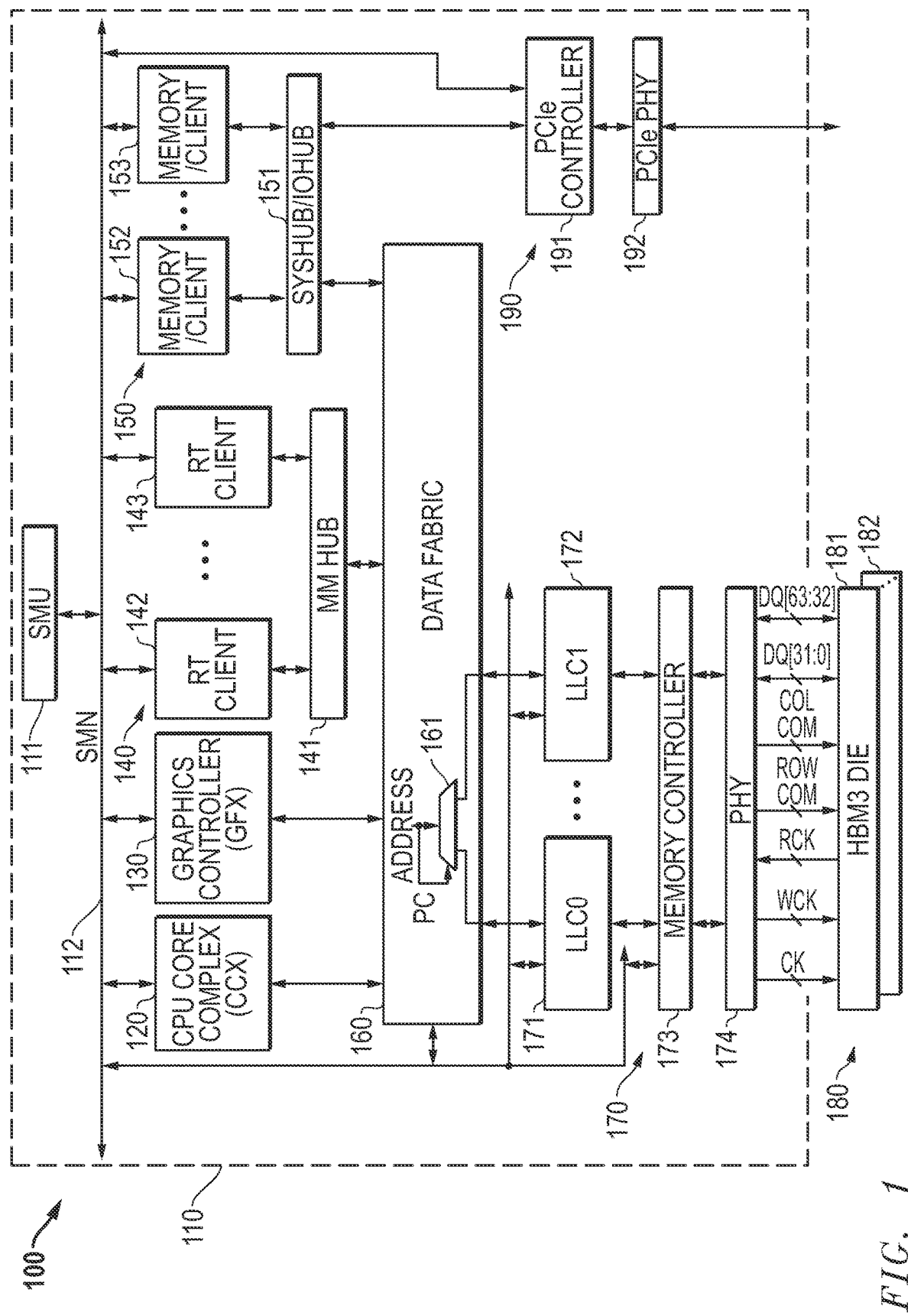
FIG. 1 illustrates in block diagram form a data processing system according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A data processor accesses a memory having a first pseudo channel and a second pseudo channel. The data processor includes at least one memory accessing agent for generating a memory access request, a memory controller for providing a memory command to the memory in response to a normalized request selectively using a first pseudo channel pipeline circuit and a second pseudo channel pipeline circuit, and a data fabric for converting the memory access request into the normalized request selectively for the first pseudo channel and the second pseudo channel.

A memory controller provides memory commands to a physical interface circuit for a memory having a first pseudo channel and a second pseudo channel. The memory controller comprises a first pseudo channel pipeline circuit and a second pseudo channel pipeline circuit, each comprising a front-end interface circuit for converting normalized addresses into decoded addresses of decoded memory access requests, a command queue coupled to the front-end interface circuit for storing the decoded memory access requests, and an arbiter for selecting among the decoded memory access requests from the command queue according to predetermined criteria and providing selected memory access requests to an output thereof.

A method for a data processor to provide commands to a memory that has a first pseudo channel and a second pseudo channel includes generating memory access requests and memory access responses. The memory access requests are routed selectively between upstream ports and downstream ports of a data fabric. The memory access responses are routed selectively between the downstream ports and the upstream ports of the data fabric. The memory access requests in the data fabric are decoded according to one of a plurality of pseudo channels including a first pseudo channel and a second pseudo channel. First memory access requests of the first pseudo channel are decoded in a first decoding and command arbitration circuit, and second memory access requests of the second pseudo channel are decoded in a second decoding and command arbitration circuit independent of the first decoding and command arbitration circuit.

FIG. 1 illustrates in block diagram form a data processing system 100 according to some embodiments. Data processing system 100 includes a data processor in the form of a system-on-chip (SOC) 110 and a memory 180 in the form of low-power High Bandwidth Memory, version 3 (HBM3). In other embodiments, memory 180 could be HBM, version four (HBM4) memory or other memory types that implement pseudo channels. Many other components of an actual data processing system are typically present but are not relevant to understanding the present disclosure and are not shown in FIG. 1 for ease of illustration.

SOC 110 includes generally a system management unit (SMU) 111, a system management network (SMN) 112, a central processing unit (CPU) core complex 120 labelled "CCX", a graphics controller 130 labelled "GFX", a real-time client subsystem 140, a memory/client subsystem 150, a data fabric 160, a memory channel 170, and a Peripheral Component Interface Express (PCIe) subsystem 190. As will be appreciated by a person of ordinary skill, SOC 110 may not have all of these elements present in every embodiment and, further, may have additional elements included therein.

SMU 111 is bidirectionally connected to the major components in SOC 110 over SMN 112. SMN 112 forms a control fabric for SOC 110. SMU 111 is a local controller that controls the operation of the resources on SOC 110 and synchronizes communication among them. SMU 111 manages power-up sequencing of the various processors on SOC 110 and controls multiple off-chip devices via reset, enable and other signals. SMU 111 includes one or more clock sources (not shown), such as a phase locked loop (PLL), to provide clock signals for each of the components of SOC 110. SMU 111 also manages power for the various processors and other functional blocks, and may receive measured power consumption values from CPU cores in CPU core complex 120 and graphics controller 130 to determine appropriate P-states.

CPU core complex 120 includes a set of CPU cores, each of which is bidirectionally connected to SMU 111 over SMN 112. Each CPU core may be a unitary core only sharing a last-level cache with the other CPU cores, or may be combined with some but not all of the other cores in clusters.

Graphics controller 130 is bidirectionally connected to SMU 111 over SMN 112. Graphics controller 130 is a high-performance graphics processing unit capable of performing graphics operations such as vertex processing, fragment processing, shading, texture blending, and the like in a highly integrated and parallel fashion. In order to perform its operations, graphics controller 130 requires periodic access to external memory. In the embodiment shown in FIG. 1, graphics controller 130 shares a common memory subsystem with CPU cores in CPU core complex 120, an architecture known as a unified memory architecture. Because SOC 110 includes both a CPU and a GPU, it is also referred to as an accelerated processing unit (APU).

Real-time client subsystem 140 includes a set of real-time clients such as representative real time clients 142 and 143, and a memory management hub 141 labelled "MM HUB". Each real-time client is bidirectionally connected to SMU 111 over SMN 112, and to memory management hub 141. Real-time clients could be any type of peripheral controller that require periodic movement of data, such as an image signal processor (ISP), an audio coder-decoder (codec), a display controller that renders and rasterizes objects generated by graphics controller 130 for display on a monitor, and the like.

Memory/client subsystem 150 includes a set of memory elements or peripheral controllers such as representative memory/client devices 152 and 153, and a system and input/output hub 151 labeled "SYSHUB/IOHUB". Each memory/client device is bidirectionally connected to SMU 111 over SMN 112, and to system and input/output hub 151. Memory/client devices are circuits that either store data or require access to data on an aperiodic fashion, such as a non-volatile memory, a static random-access memory (SRAM), an external disk controller such as a Serial Advanced Technology Attachment (SATA) interface controller, a universal serial bus (USB) controller, a system management hub, and the like.

Data fabric 160 is an interconnect that controls the flow of traffic in SOC 110. Data fabric 160 is bidirectionally connected to SMU 111 over SMN 112, and is bidirectionally connected to CPU core complex 120, graphics controller 130, memory management hub 141, system and input/output hub 151. Data fabric 160 includes a crossbar switch for routing memory-mapped access requests and responses between any of the various devices of SOC 110. It includes a system memory map, defined by a basic input/output system (BIOS), for determining destinations of memory accesses based on the system configuration, as well as buffers for each virtual connection. In addition, it has a pseudo-channel decoder circuit 161 for providing memory access requests to two downstream ports. Pseudo-channel decoder circuit 161 has an input for receiving a memory access request including a multi-bit address labelled "ADDRESS", a first output connected to a first downstream port, and a second output connected to the second downstream port, and a control input for receiving a bit of the ADDRESS labelled "PC".

Memory channel 170 is a circuit that controls the transfer of data to and from memory 180. Memory channel 170 includes a last-level cache 171 labelled "LLC0", a last-level cache 172 labelled "LLC1", a memory controller 173, and a physical interface circuit 173 labelled "PHY" connected to memory 180. Last-level cache 171 is bidirectionally connected to SMU 111 over SMN 112, and has an upstream port connected to the first downstream port of data fabric 160, and a downstream port. Last-level cache 172 is bidirectionally connected to SMU 111 over SMN 112, and has an upstream port connected to the second downstream port of data fabric 160, and a downstream port. Memory controller 173 has a first upstream port connected to the downstream port of last-level cache 171, a second upstream port connected to the downstream port of last-level cache 172, a first downstream port, and a second downstream port. Physical interface circuit 174 has a first upstream port bidirectionally connected to the first downstream port of memory controller 173, a second upstream port bidirectionally connected to the second downstream port of memory controller 173, and a downstream port bidirectionally connected to memory 181. The downstream port of physical interface circuit 174 conforms to the HBM3 standard, and includes a set of differential pairs of command clock signals for each channel and/or pseudo channel collectively labelled "CK", a set of differential pairs of write data strobe signals for each channel and/or pseudo channel collectively labelled "WDQS", a set of differential pairs of read data strobe signals for each channel and/or pseudo channel collectively labelled "RDQS", a set of row command signals for each channel and/or pseudo channel collectively labelled "ROW COM", a set of column command signals for each channel and/or pseudo channel collectively labelled "COL COM", a set of data signals for pseudo channel 0 for each channel labelled "DQ[31:0]", and a set of data signals for pseudo channel 1 for each channel labelled "DQ[63:32]".

Peripheral Component Interface Express (PCIe) subsystem 190 includes a PCIe controller 191 and a PCIe physical interface circuit 192. PCIe controller 191 is bidirectionally connected to SMU 111 over SMN 112 and has an upstream port bidirectionally connected to system and input/output hub 151, and a downstream port. PCIe physical interface circuit 192 has an upstream port bidirectionally connected to PCIe controller 191, and a downstream port bidirectionally connected to a PCIe fabric, not shown in FIG. 1. PCIe controller 191 is capable of forming a PCIe root complex of a PCIe system for connection to a PCIe network including PCIe switches, routers, and devices.

In operation, SOC 110 integrates a complex assortment of computing and storage devices, including CPU core complex 120 and graphics controller 130, on a single chip. Most of these controllers are well-known and will not be discussed further. SOC 110 includes multiple internal buses for conducting data between these circuits at high speed. For example, CPU core complex 120 accesses data over a high-speed 32-bit bus through an upstream port of data fabric 160. Data fabric 160 multiplexes accesses between any of a number of memory accessing agents connected to its upstream ports, and memory accessing responders connected to its downstream ports. Because of the large number of memory accessing agents and memory accessing responders, the number of internal bus lines is quite large as well and the crossbar switch in data fabric 160 multiplexes these wide buses to form virtual connections between the memory access requesters and the memory accessing responders.

The various processing nodes also maintain their own cache hierarchies. In a typical configuration, CPU core complex 120 includes four CPU cores each having its own dedicated level-one (L1) and level two (L2) caches, and having a level three (L3) cache shared between the four CPU cores in the cluster. In this example, last-level caches 171 and 172 would form level four (L4) caches, but regardless of the internal organization of the cache hierarchies in CPU core complex 120, they operate as the last-level cache in the cache hierarchy. In one example, last-level caches 171 and 172 implement inclusive caches, in which any cache line stored in any higher-level cache in SOC 110 will also be stored in last-level caches 171 and 172. In another example, last-level caches 171 and 172 is a victim cache, and includes cache lines each of which contained data that was requested by a data processor at an earlier point in time, but ultimately became the least recently used cache line and was evicted from all upper-layer caches.

Data processing system 100 uses HBM3, currently a new and emerging type of memory that provides an opportunity to increase memory bandwidth over other types of DDR SDRAMs. HBM uses vertically-stacked memory die that communicate using short, through-silicon via (TSV) technology that shortens the physical distance between the processor and memory and allows faster speed of operation with greater bus width. In particular, HBM3 supports "pseudo channels", which allow different parts of the memory die to be accessed independently using separate data paths with common command and address paths. Since command and address signals are provided at a lower frequency than data signals, command and address information can be sent from a memory controller to an HBM3 memory stack between the two pseudo-channels in an interleaved fashion. In other embodiments, data processing system 100 could use HBM, version four (HBM4) memory or other memory types that implement pseudo channels.

As will be explained further below, SOC 110 uses an architecture in which data fabric 160 is pseudo-channel aware. For example, in one embodiment, the physical addresses provided by a memory accessing agent, such as CPU core complex 120 or graphics controller 130, are mapped to different pseudo-channels based on a single address bit. Because of this feature, data fabric 160 can separate accesses based on the accessed pseudo-channel by examining a single bit of the physical address and routing (de-multiplexing) them to a particular downstream port based on the accessed pseudo-channel. Memory controller 173 receives a normalized address on a respective one of its upstream ports that does not include the PC bit.

This pseudo-channel awareness allows memory controller 173 to select accesses for each pseudo channel independently so that the accesses are re-ordered and prioritized based on the particular access patterns in each pseudo-channel. The prioritization can be accomplished by an arbiter for each pseudo-channel that uses the same arbitration rules, and thus the arbitration and other circuitry associated with each pseudo-channel can be easily replicated without the need for re-design.

Physical interface circuit 174 then receives the accesses on upstream ports that correspond to different timing slots, and provides them to the HBM3 die in a deserialized fashion using the pseudo-channel interleaving of HBM3. As will be explained below, the deserialization can take place either in PHY 174 as shown in FIG. 1, or in memory controller 173.

Figure 2:
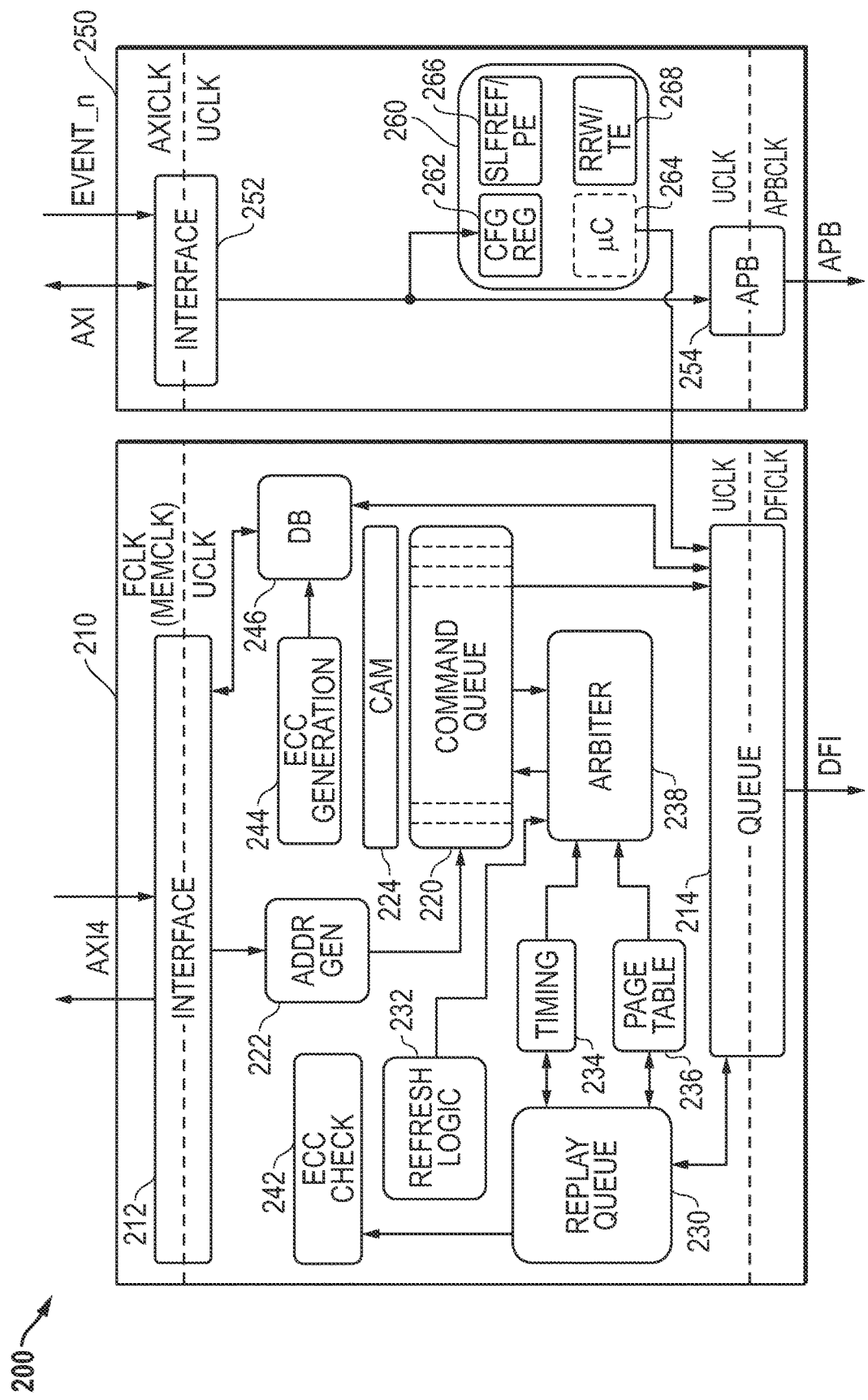
FIG. 2 illustrates in block diagram form a memory controller known in the prior art according to some embodiments.

FIG. 2 illustrates in block diagram form a memory controller 200 known in the prior art. Memory controller 200 includes a memory channel controller 210 and a power controller 250. Memory channel controller 210 includes an interface 212, a queue 214, a command queue 220, an address generator 222, a content addressable memory (CAM) 224, a replay queue 230, a refresh logic block 232, a timing block 234, a page table 236, an arbiter 238, an error correction code (ECC) check block 242, an ECC generation block 244, and a data buffer (DB) 246.

Interface 212 has a first bidirectional connection to the data fabric over an external bus, and has an output. In memory controller 200, this external bus is compatible with the advanced extensible interface version four specified by ARM Holdings, PLC of Cambridge, England, known as "AXI4", but can be other types of interfaces in other embodiments. Interface 212 translates memory access requests from a first clock domain known as the FCLK (or MEMCLK) domain to a second clock domain internal to memory controller 200 known as the UCLK domain. Similarly, queue 214 provides memory accesses from the UCLK domain to the DFICLK domain associated with the DFI interface.

Address generator 222 decodes addresses of memory access requests received from the data fabric over the AXI4 bus. The memory access requests include access addresses in the physical address space represented in as a normalized address. Address generator 222 converts the normalized addresses into a format that can be used to address the actual memory devices in the memory system, as well as to efficiently schedule related accesses. This format includes a region identifier that associates the memory access request with a particular rank, a row address, a column address, a bank address, and a bank group. On startup, the system BIOS queries the memory devices in the memory system to determine their size and configuration, and programs a set of configuration registers associated with address generator 222. Address generator 222 uses the configuration stored in the configuration registers to translate the normalized addresses into the appropriate format. Command queue 220 is a queue of memory access requests received from the memory accessing agents in data processing system 100, such as CPU cores in CPU core complex 120 and graphics controller 130. Command queue 220 stores the address fields decoded by address generator 222 as well other address information that allows arbiter 238 to select memory accesses efficiently, including access type and quality of service (QoS) identifiers. CAM 224 includes information to enforce ordering rules, such as write after write (WAW) and read after write (RAW) ordering rules.

Replay queue 230 is a temporary queue for storing memory accesses picked by arbiter 238 that are awaiting responses, such as address and command parity responses, write cyclic redundancy check (CRC) responses for DDR4 DRAM or write and read CRC responses for GDDR5 DRAM. Replay queue 230 accesses ECC check block 242 to determine whether the returned ECC is correct or indicates an error. Replay queue 230 allows the accesses to be replayed in the case of a parity or CRC error of one of these cycles.

Refresh logic block 232 includes state machines for various powerdown, refresh, and termination resistance (ZQ) calibration cycles that are generated separately from normal read and write memory access requests received from memory accessing agents. For example, if a memory rank is in precharge powerdown, it must be periodically awakened to run refresh cycles. Refresh logic block 232 generates auto-refresh commands periodically to prevent data errors caused by leaking of charge off storage capacitors of memory cells in DRAM chips. In addition, refresh logic block 232 periodically calibrates ZQ to prevent mismatch in on-die termination resistance due to thermal changes in the system. Refresh logic block 232 also decides when to put DRAM devices in different power down modes.

Arbiter 238 is bidirectionally connected to command queue 220 and is the heart of memory channel controller 210. It improves efficiency by intelligent scheduling of accesses to improve the usage of the memory bus. Arbiter 238 uses timing block 234 to enforce proper timing relationships by determining whether certain accesses in command queue 220 are eligible for issuance based on DRAM timing parameters. For example, each DRAM has a minimum specified time between activate commands to the same bank, known as "$t_{RC}$". Timing block 234 maintains a set of counters that determine eligibility based on this and other timing parameters specified in the JEDEC specification, and is bidirectionally connected to replay queue 230. Page table 236 maintains state information about active pages in each bank and rank of the memory channel for arbiter 238, and is bidirectionally connected to replay queue 230.

In response to write memory access requests received from interface 212, ECC generation block 244 computes an ECC according to the write data. DB 246 stores the write data and ECC for received memory access requests. It outputs the combined write data/ECC to queue 214 when arbiter 238 picks the corresponding write access for dispatch to the memory channel.

Power controller 250 includes an interface 252 to an advanced extensible interface, version one (AXI), an APB interface 254, and a power engine 260. Interface 252 has a first bidirectional connection to the SMN, which includes an input for receiving an event signal labeled "EVENT_n" shown separately in FIG. 5, and an output. APB interface 554 has an input connected to the output of interface 252, and an output for connection to a PHY over an APB. Power engine 260 has an input connected to the output of interface 252, and an output connected to an input of queue 214. Power engine 260 includes a set of configuration registers 262, a microcontroller (μC) 264, a self refresh controller (SLFREF/PE) 266, and a reliable read/write training engine (RRW/TE) 268. Configuration registers 262 are programmed over the AXI bus, and store configuration information to control the operation of various blocks in memory controller 200. Accordingly, configuration registers 262 have outputs connected to these blocks that are not shown in detail in FIG. 2. Self refresh controller 266 is an engine that allows the manual generation of refreshes in addition to the automatic generation of refreshes by refresh logic block 232. Reliable read/write training engine 268 provides a continuous memory access stream to memory or I/O devices for such purposes as DDR interface read latency training and loopback testing.

Memory channel controller 210 includes circuitry that allows it to pick memory accesses for dispatch to the associated memory channel. In order to make the desired arbitration decisions, address generator 222 decodes the address information into predecoded information including rank, row address, column address, bank address, and bank group in the memory system, and command queue 220 stores the predecoded information. Configuration registers 262 store configuration information to determine how address generator 222 decodes the received address information. Arbiter 238 uses the decoded address information, timing eligibility information indicated by timing block 234, and active page information indicated by page table 236 to efficiently schedule memory accesses while observing other criteria such as QoS requirements. For example, arbiter 238 implements a preference for accesses to open pages to avoid the overhead of precharge and activation commands required to change memory pages, and hides overhead accesses to one bank by interleaving them with read and write accesses to another bank. In particular during normal operation, arbiter 238 may decide to keeps pages open in different banks until they are required to be precharged prior to selecting a different page.

Figure 3:
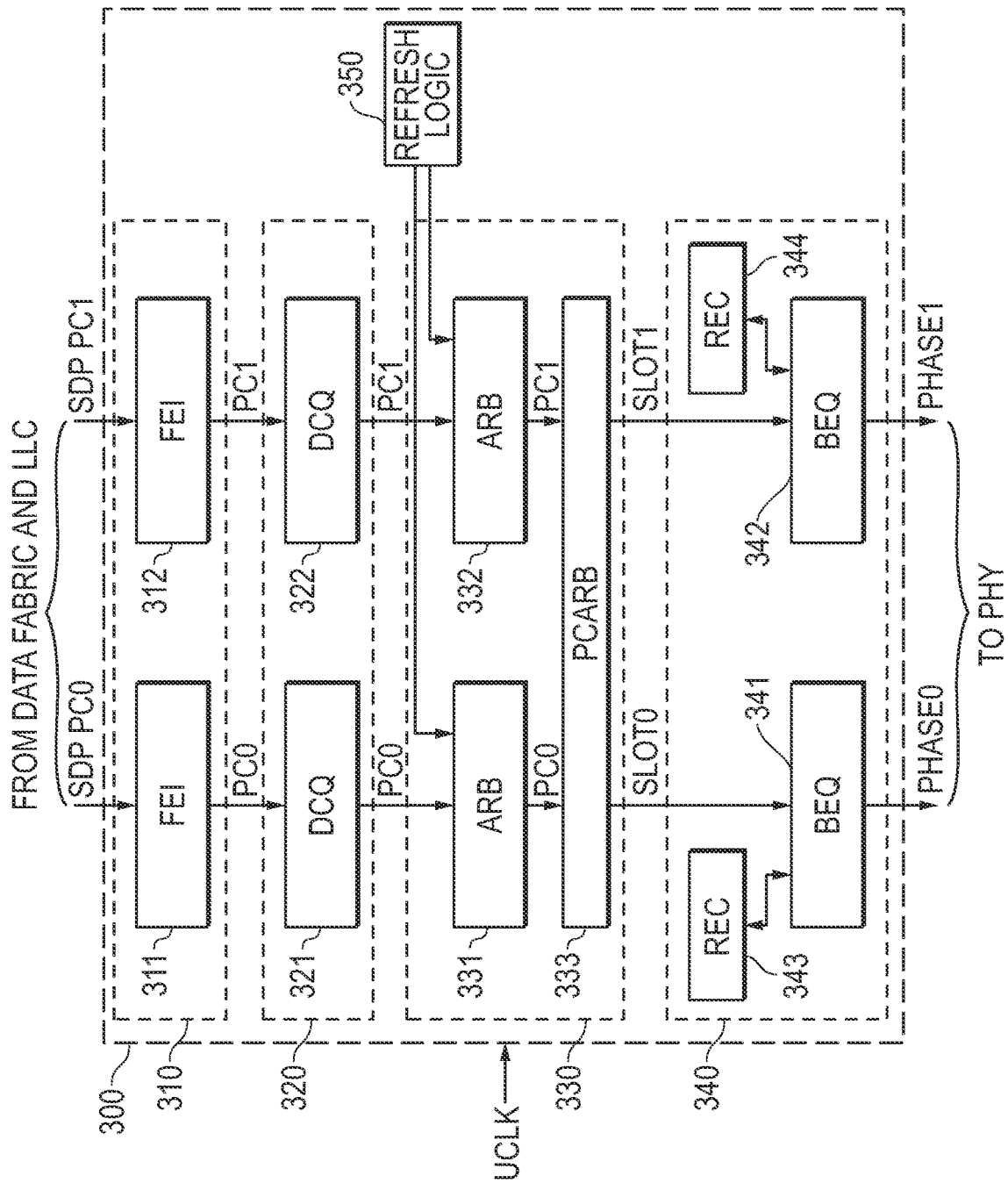
FIG. 3 illustrates in block diagram form a memory controller that can be used as the memory controller of FIG. 1 according to some embodiments.

FIG. 3 illustrates in block diagram form a memory controller 300 that can be used as memory controller 173 of FIG. 1 according to some embodiments. Memory controller 300 includes generally a front-end interface stage 310, a DRAM command queue stage 320, an arbiter stage 330, a back-end queue stage 340, and a refresh logic circuit 350. Memory controller 300 includes other elements similar to those shown in FIG. 2, but those circuit blocks are not important to understanding the disclosed embodiments and will not be described further.

Front-end interface stage 310 is a circuit that includes front-end interface circuits 311 and 312, each labelled "FEI". Front-end interface circuit 311 has an upstream port connected to the first downstream port of data fabric 160 and a downstream port. In the embodiment of FIG. 3, the upstream port uses an interface known as a scalable data port (SDP) and the upstream port is therefore labelled "SDP PC0", and the downstream port conducts memory access requests for pseudo channel 0 and is therefore labelled "PC0". Front-end interface circuit 312 has an upstream port connected to the second downstream port of data fabric 160 labelled "SDP PC1", and a downstream port labelled "PC1".

DRAM command queue stage 320 is a circuit that includes DRAM command queues 321 and 322, each labelled "DCQ". DRAM command queue 321 has an upstream port connected to the downstream port of front-end interface circuit 311, and a downstream port similarly labelled "PC0". DRAM command queue 322 has an upstream port connected to the downstream port of front-end interface circuit 312, and a downstream port similarly labelled "PC1".

Arbiter stage 330 is a circuit that includes arbiters 331 and 332, each labelled "ARB", and a pseudo-channel arbiter 333 labelled "PCARB". Arbiter 331 has a first upstream port connected to the downstream port of DRAM command queue 321, a second upstream port, and a downstream port similarly labelled "PC0". Arbiter 332 has a first upstream port connected to the downstream port of DRAM command queue 322, a second upstream port, and a downstream port similarly labelled "PC1". Pseudo channel arbiter 333 has a first upstream port connected to the downstream port of arbiter 331, a second upstream port connected to the downstream port of arbiter 332, a first downstream port labelled "SLOT0", and a second downstream port labelled "SLOT1".

Back-end queue stage 340 is a circuit includes back-end queues 341 and 342 each labelled "BEQ", and command replay queues 343 and 344 each labelled "REC". Back-end queue 341 has a first upstream port connected to the first downstream port of pseudo-channel arbiter 333, a second upstream port, and a downstream port connected to physical interface circuit 174 for providing signals for a first phase labelled "PHASE 0". Back-end queue 342 has a first upstream port connected to the second downstream port of pseudo-channel arbiter 333, a second upstream port, and a downstream port connected to physical interface circuit 174 for providing signals for a second phase labelled "PHASE 1". Command replay queue 343 has a downstream port bidirectionally connected to the second upstream port of back-end queue 341. Command replay queue 344 has a downstream port bidirectionally connected to the second upstream port of back-end queue 342.

Refresh logic circuit 350 has a first output connected to the second upstream port of arbiter 331, and a second output connected to the second upstream port of arbiter 332. In the embodiment shown in FIG. 3, refresh logic circuit 350 generates refresh accesses to each of arbiters 331 and 332 based on requirements of memory 180. Refresh logic circuit 350 includes state machines for various powerdown, refresh, and termination resistance (ZQ) calibration cycles that are generated separately from normal read and write memory access requests received from memory accessing agents. For example, if a memory is in precharge powerdown, it must be periodically awakened to run refresh cycles. Refresh logic circuit 350 generates auto-refresh commands periodically to prevent data errors caused by leaking of charge off storage capacitors of memory cells in DRAM chips. In addition, refresh logic circuit 350 periodically calibrates ZQ to prevent mismatch in on-die termination resistance due to thermal changes in the system. Refresh logic circuit 350 also decides when to put DRAM devices in different power down modes. In other embodiments, memory controller 300 can include separate refresh logic blocks for each pseudo channel.

Memory controller 300 leverages the ability of data fabric 160 to identify the pseudo-channel of the access and separate the requests. Memory controller 300 implements parallel pseudo-channel pipelines that receive normalized requests from data fabric 160. Each normalized request includes a normalized address for the physical address space associated with the particular pseudo-channel. Each of the parallel pseudo-channel pipelines decodes its respective normalized address to map the normalized request to its own physical address space without consideration of the pseudo-channel bit or bits of the memory access request. Thus, front-end interface circuit 311, command queue 321, and arbiter 331 form a pseudo-channel pipeline circuit for PC0, and front-end interface circuit 312, command queue 322, and arbiter 332 form a pseudo-channel pipeline circuit for PC1.

Memory controller 300 operates according to the UCLK signal. In some embodiments, the UCLK signal is one half the frequency of the MEMCLK signal. For example, in some embodiments, the UCLK signal is 1 gigahertz (1 GHz), whereas the MEMCLK signal is 2 GHz. This slower UCLK speed allows arbiters 331 and 332 to resolve timing dependencies and eligibility during a single UCLK cycle. Arbiters 331 and 332 re-order accesses for efficiency using normal criteria during each UCLK cycle, so that back-end queue 341 and back-end queue 342 can send commands for both PC0 and PC1, respectively, in the same UCLK cycle. In the case of an activation (ACT) command, the respective back-end queue stretches the command for both phases. Thus, if the ACT command issues from PHASE 1, then PHASE 0 of the next command cycle cannot be filled with any command.

Memory controller 300 adds a special pseudo-channel arbitration arbiter 333 that arbitrates between the requests for the pseudo channels to identify the best access pattern based on required minimum timing for the memories. Pseudo-channel arbiter 333 considers timing constraints in each pseudo channel and places the accesses preferentially into one of two command timing slots. Arbiters 331 and 332 indicate which phase of the MEMCLK signal the command will be on. For example, if an activate to read command (ACT to RD) time is satisfied on an odd number of clocks and the ACT command was started in PHASE 0, then pseudo-channel arbiter 333 issues the RD from PHASE 1. If a conflict occurs, then the pseudo channel different from the previous winner of the pseudo-channel arbitration will be taken. Then back-end queues 341 and 342 send commands to physical interface circuit 174 to multiplex them on the HBM3 command bus according to the selected phase of the UCLK signal based on their slot.

Memory controller 300 implements shared circuit blocks for special operations. For example, refresh logic circuit 350 that controls powerdown, refresh, and ZQ calibration cycles is shared between both pseudo-channel pipelines for efficiency. Similarly, the register file and other blocks corresponding to blocks in power controller 250 (not shown in FIG. 3) are shared in common between the pseudo channels. However, each of command replay queues 343 and 344 is dedicated to a specific pseudo channel and sends replays in a dedicated command slot. Command replay queues 343 and 344 only support dependent replays, and in response to a replay, a command replay queue stalls read and write operations in both pseudo channels, and in power controller shared between the channels.

Physical interface circuit 174 serializes two inputs received in one UCLK cycle to the higher MEMCLK rate.

By running the parallel pipelines, memory controller 300 operates at a slower speed needed to resolve arbitration decisions and uses a lower power supply voltage to reduce power consumption but adding an acceptable increase in die area.

Figure 4:
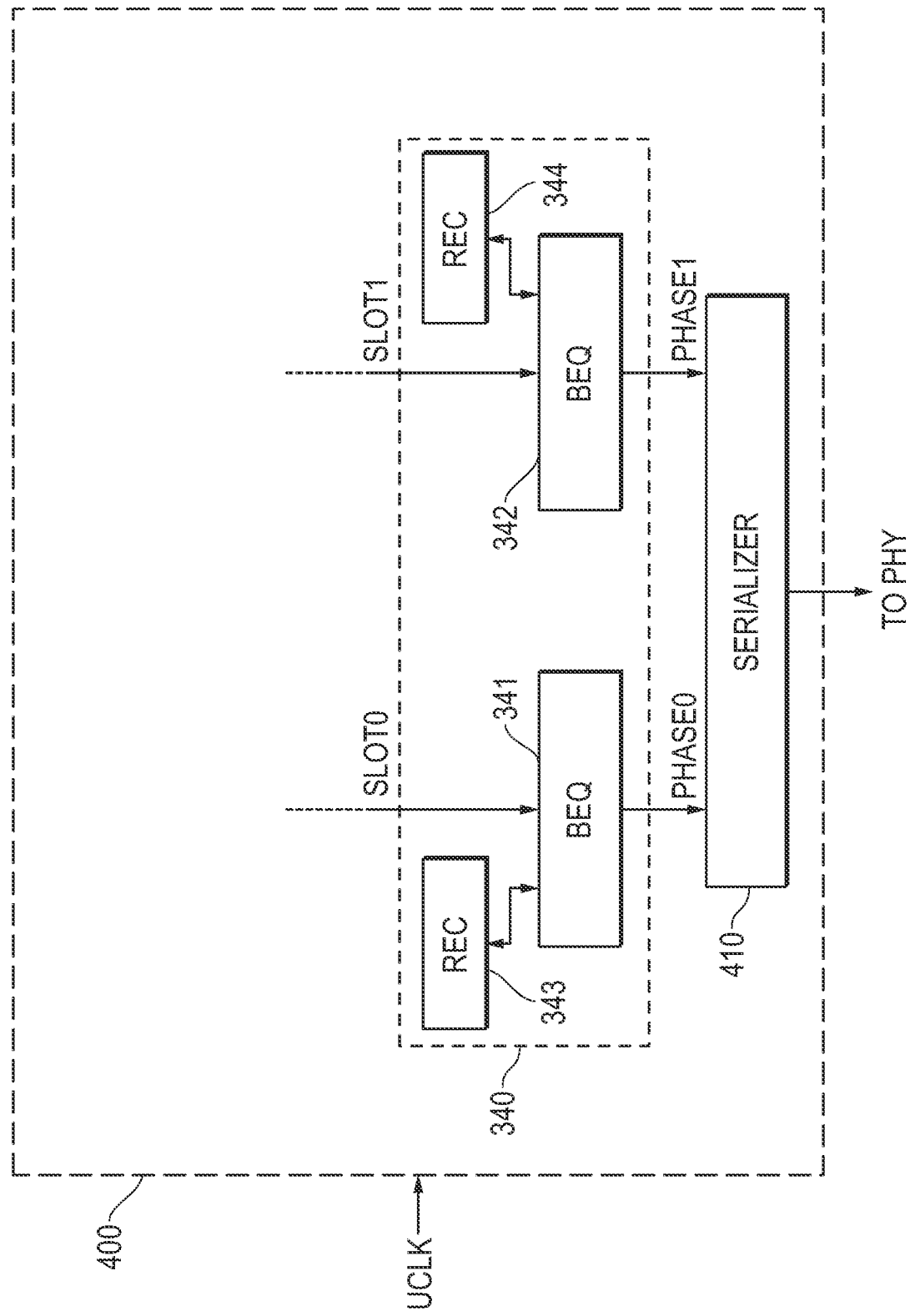
FIG. 4 illustrates in block diagram form another memory controller that can be used as the memory controller of FIG. 1 according to some embodiments.

FIG. 4 illustrates in block diagram form another memory controller 400 that can be used as memory controller 173 of FIG. 1 according to some embodiments. Memory controller 400 is constructed the same as memory controller 300 of FIG. 3, except it additionally has a serializer 410 that provides memory commands to physical interface circuit 174 based on serializing accesses to a first command phase, known as PHASE0, and a second command phase, known as PHASE 1, based on the re-ordering of the pseudo-channel requests by pseudo-channel arbiter 333 of FIG. 1. Memory controller 400 would be useful if the interface between memory controller 173 and physical interface circuit 174 were standardized to include a serialized pseudo-channel access pattern. For example, a specification known as the DDR-PHY Interface (DFI) Specification has been promulgated by Cadence Design Systems, Inc. and allows memory controller and PHY designs to be re-used among different integrated circuit manufacturers. Memory controller 400 would accommodate inter-operability with a future DFI standard if the future DFI standard assumed pseudo-channel interleaving had been performed by the memory controller.

A data processor, SOC, memory controller, portions thereof described herein can be embodied one or more integrated circuits, any of which may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, a pseudo-channel aware data fabric could decode a single address bit to separate accesses into different pseudo-channels, or decode a more-complicated memory mapping function. The memory controller can use the same arbitration rules for each pseudo channel to simplify design, or allow accessed to be processed differently for the two pseudo-channels. The memory controller can perform separate arbitrations in each pseudo-channel, but then re-order the outputs of each pseudo-channel based on timing eligibility criteria to improve the utilization of the pseudo-channel bus. Refresh logic and associated non-memory accessing functions could be consolidated into a single refresh logic block for all pseudo-channels, or separated into similar blocks for each pseudo-channel. Moreover, serialization of accesses can take place either in the PHY or in the memory controller.

Accordingly, it is intended by the appended claims to cover all modifications of the disclosed embodiments that fall within the scope of the disclosed embodiments.

What is claimed is:

1. A data processor for accessing a memory having a first pseudo channel and a second pseudo channel, comprising:
   at least one memory accessing agent for generating a memory access request;
   a memory controller for providing memory commands to the memory in response to a normalized request selectively using a first pseudo channel pipeline circuit and a second pseudo channel pipeline circuit, wherein each of the first and second pseudo channel pipeline circuits re-orders and prioritizes accesses based on particular access patterns in its respective pseudo channel;
   a data fabric coupled between said at least one memory accessing agent and said memory controller for converting said memory access request into said normalized request selectively for said first pseudo channel pipeline circuit and said second pseudo channel pipeline circuit; and
   a serializer that is operable to serialize memory commands from said first pseudo channel pipeline circuit and said second pseudo channel pipeline circuit.

2. The data processor of claim 1, wherein:
   said data fabric converts said memory access request into said normalized request by decoding said memory access request into a pseudo channel bit and a normalized address that does not include said pseudo channel bit, and provides said normalized address to a selected one of said first pseudo channel pipeline circuit and said second pseudo channel pipeline circuit.

3. The data processor of claim 2, wherein said data fabric comprises:
   a pseudo channel decoder circuit that in response to a predetermined bit of an access address being in a first logic state, routes said memory access request to said first pseudo channel pipeline circuit, and in response to said predetermined bit of said access address being in a second logic state, routes said memory access request to said second pseudo channel pipeline circuit.

4. The data processor of claim 1, wherein:
   said data fabric is further for routing said normalized request to one of said first pseudo channel pipeline circuit and said second pseudo channel pipeline circuit based on a pseudo channel address of said memory access request.

5. The data processor of claim 1, wherein each of said first pseudo channel pipeline circuit and said second pseudo channel pipeline circuit comprises:
   a front-end interface circuit coupled to said data fabric for converting normalized addresses into decoded addresses of decoded memory access requests;
   a command queue coupled to said front-end interface circuit for storing said decoded memory access requests; and
   an arbiter for selecting among said decoded memory access requests from said command queue according to predetermined criteria and providing selected memory access requests to an output thereof.

6. The data processor of claim 5, wherein said arbiter of said first pseudo channel pipeline circuit uses substantially the same criteria as said arbiter of said second pseudo channel pipeline circuit.

7. The data processor of claim 5, wherein said memory controller further comprises:
   a pseudo channel arbiter for selecting between outputs of said arbiter for each of said first pseudo channel pipeline circuit and said second pseudo channel pipeline circuit and providing memory access commands to a first phase output for a first phase and a second phase output for a second phase based on memory access timing eligibility.

8. The data processor of claim 7, further comprising a physical interface circuit having a first phase input coupled to said first phase output of said pseudo channel arbiter and a second phase input coupled to said second phase output of said pseudo channel arbiter, and an output coupled to the memory, wherein said physical interface circuit serializes first memory access commands of said first phase and second memory access commands of said second phase on a common command bus for both pseudo channels.

9. The data processor of claim 7, further comprising:
   a first back-end queue for said first phase having a first input coupled to said first phase output of said pseudo channel arbiter, a second input for receiving replay commands for said first pseudo channel, and an output; and
   a second back-end queue for said second phase having a first input coupled to said second phase output of said pseudo channel arbiter, a second input for receiving replay commands for said second pseudo channel, and an output.

10. The data processor of claim 5, wherein:
    said front-end interface circuit, said command queue, and said arbiter of each of said first pseudo channel pipeline circuit and said second pseudo channel pipeline circuit operate according to a memory controller clock signal; and
    a physical interface circuit provides said memory commands to the memory using a memory clock signal, wherein said memory clock signal has a higher frequency than said memory controller clock signal.

11. A memory controller for providing memory commands to a physical interface circuit for a memory having a first pseudo channel and a second pseudo channel, comprising:
    a first pseudo channel pipeline circuit and a second pseudo channel pipeline circuit, each comprising:
       a front-end interface circuit for receiving normalized addresses of a respective one of the first pseudo channel and the second pseudo channel, where in the normalized addresses do not indicate a pseudo channel, for converting said normalized addresses into decoded addresses of decoded memory access requests;

a command queue coupled to said front-end interface circuit for storing said decoded memory access requests; and an arbiter for selecting among said decoded memory access requests from said command queue according to predetermined criteria and providing selected memory access requests to an output thereof, and a serializer that is operable to serialize memory commands from said first pseudo channel pipeline circuit and said second pseudo channel pipeline circuit, wherein each of the first and second pseudo channel pipeline circuits re-orders and prioritizes accesses based on particular access patterns in its respective pseudo channel.

12. The memory controller of claim 11, further comprising:

a back-end queue stage having a first back-end queue for a first phase of a command bus to the memory and a second back-end queue for a second phase of said command bus to the memory.

13. The memory controller of claim 12, wherein:

each of said first back-end queue and said second back-end queue has a first input for receiving replay commands for a respective one of the first pseudo channel and the second pseudo channel.

14. The memory controller of claim 12, wherein:

said front-end interface circuit, said command queue, and said arbiter of each of said first pseudo channel and said second pseudo channel operate according to a memory controller clock signal, and wherein said back-end queue stage receives memory access commands from said arbiter using said memory controller clock signal, and provides said memory access commands to first and second phase inputs of the physical interface circuit using a memory clock signal, wherein said memory clock signal has a higher frequency than said memory controller clock signal.

15. The memory controller of claim 12, wherein:

said serializer has a first input coupled to an output of said first back-end queue, a second input coupled to an output of said second back-end queue, and an output coupled to a first input of the physical interface circuit.

16. The memory controller of claim 12, wherein:

said first back-end queue has an output coupled to a first input of the physical interface circuit; and said second back-end queue has an output coupled to a second input of the physical interface circuit, wherein the physical interface circuit serializes said output of said first back-end queue and said output of said second back-end queue before providing said memory commands for the first and second pseudo channels to the memory.

17. A method for a data processor to provide commands to a memory that has a first pseudo channel and a second pseudo channel, comprising:

generating memory access requests;

routing said memory access requests selectively between upstream ports and downstream ports of a data fabric, and memory access responses selectively between said downstream ports and said upstream ports of said data fabric;

decoding said memory access requests in said data fabric according to one of a plurality of pseudo channels including the first pseudo channel and the second pseudo channel based on a pseudo channel address of said memory access request;

processing first memory access requests of said first pseudo channel in a first decoding and command arbitration circuit;

processing second memory access requests of said second pseudo channel in a second decoding and command arbitration circuit, wherein processing said first memory access requests and processing said second memory access requests comprise re-ordering and prioritizing accesses based on particular access patterns in each respective pseudo channel; and providing memory commands to the memory based on serializing memory commands processed by said first decoding and command arbitration circuit and memory commands processed by said second decoding and command arbitration circuit.

18. The method of claim 17, further comprising:

arbitrating outputs of said first decoding and command arbitration circuit and said second decoding and command arbitration circuit selectively onto a first phase port and a second phase port based on memory timing criteria.

19. The method of claim 18, comprising:

combining commands from said first phase port and said second phase port onto a physical interface to the memory using a physical interface circuit.

20. The method of claim 19, comprising:

processing said memory access requests of said first pseudo channel and said memory access requests of said second pseudo channel at a memory controller clock rate, and operating said physical interface circuit at a memory clock rate, wherein said memory clock rate is higher than said memory controller clock rate.

* * * * *